US00RE35422E

United States Patent [19]

Levers

[11] E Patent Number: Re. 35,422

[45] Reissued Date of Patent: Jan. 14, 1997

[54] APPARATUS AND METHOD FOR CONTROLLING A WINDSHIELD WIPING SYSTEM

[75] Inventor: Juergen Levers, Bochum, Germany

[73] Assignee: Leopold Kostal GmbH & Co. KG, Ludenscheid, Germany

[21] Appl. No.: 562,851

[22] Filed: Nov. 27, 1995

Related U.S. Patent Documents

Reissue of:

[64] Patent No.: 5,336,980
Issued: Aug. 9, 1994
Appl. No.: 989,052
Filed: Dec. 10, 1992

[30] Foreign Application Priority Data

Dec. 14, 1991 [DE] Germany ..... 41 41 348.2

[51] Int. Cl.[6] ..... H02P 1/04

[52] U.S. Cl. ..... 318/444; 318/483; 318/443

[58] Field of Search ..... 318/443, 444, 318/453, DIG. 2; 15/250.17; 307/9.1, 10.1, 10.8

[56] References Cited

U.S. PATENT DOCUMENTS

| | | | |
|---|---|---|---|
| 3,947,131 | 3/1976 | Karl . | |
| 4,481,450 | 11/1984 | Watanabe et al. . | |
| 4,588,935 | 5/1986 | Kaneiwa et al. . | |
| 4,595,866 | 6/1986 | Fukatsu et al. | 318/444 |
| 4,798,956 | 1/1989 | Hochstein . | |
| 4,908,554 | 3/1990 | Chance | 318/483 |
| 4,987,354 | 1/1991 | Steinmann | 318/944 |
| 5,015,931 | 5/1991 | Muller . | |
| 5,059,877 | 10/1991 | Teder | 318/444 |
| 5,140,234 | 8/1992 | Wallrafen | 318/444 |
| 5,157,312 | 10/1992 | Wallrafer | 318/483 |
| 5,157,314 | 10/1992 | Kuhbauch | 318/443 |
| 5,216,341 | 6/1993 | Nomura et al. | 318/444 |

FOREIGN PATENT DOCUMENTS

| | | |
|---|---|---|
| 3538553A1 | 5/1987 | Germany . |
| 3314770C2 | 11/1987 | Germany . |
| 3722510A1 | 1/1989 | Germany . |
| 3733762A1 | 4/1989 | Germany . |
| 277437A1 | 4/1990 | Germany . |
| 3930732A1 | 3/1991 | Germany . |
| 3937920A1 | 5/1991 | Germany . |
| 0438633A1 | 7/1991 | Germany . |
| 4011510C1 | 7/1991 | Germany . |
| WO9107298 | 5/1991 | WIPO . |

*Primary Examiner*—William M. Shoop, Jr.
*Assistant Examiner*—Karen Masih
*Attorney, Agent, or Firm*—Brooks & Kushman P.C.

[57] ABSTRACT

An apparatus and method for controlling a windshield wiping system, including a motor and windshield wipers, by detecting when a wiper passes over the portion of the windshield monitored by an optoelectronic sensor for the last time during a complete wipe cycle. In addition to the sensor, the apparatus includes a switch arrangement for activating the windshield wiping system and a circuit for processing the sensor output. The apparatus also includes a switching contact device associated with the motor for detecting the resting position of the windshield wipers.

16 Claims, 2 Drawing Sheets

APPARATUS AND METHOD FOR CONTROLLING A WINDSHIELD WIPING SYSTEM

Matter enclosed in heavy brackets [ ] appears in the original patent but forms no part of this reissue specification; matter printed in italics indicates the additions made by reissue.

TECHNICAL FIELD

The present invention relates to a windshield wiping system and, more particularly, to an apparatus and method for controlling the windshield wiping system based on the quality and quantity of a liquid or solid coating present on the windshield.

BACKGROUND ART

A device for controlling a wiper motor is described in German patent DE 33 14 770 C2. The device includes an optoelectronic sensor apparatus and a circuit arrangement connected to the drive motor, so that control of the drive motor my be effected in dependence upon the coating present on the windshield.

The 33 14 770 C2 device does not, however, comprise any means allowing detection of the last sweep process of a wiping cycle which effects a last cleaning of the measuring range of the sensor apparatus. Thus, the device may indeed to some extent satisfactorily adapt the wiping cycle frequency automatically to quantitative changes arising during wiper operation in the condition of the coating on the windshield, such as, for example, the degree of dirt accumulation, the quantity of rain or snow striking the windshield. However, it is not possible satisfactorily to achieve precise automatic adaptation of the wiping cycle frequency to both qualitative and quantitative changes in the condition of the coating on the windshield.

SUMMARY OF THE INVENTION

It is therefore an object of the present invention to provide an improved apparatus and method for controlling a windshield wiping system.

It is a further object of the present invention to provide an improved apparatus and method for controlling a windshield wiping system capable of detecting the last sweep of a windshield wiper over a monitored portion of a windshield, thereby allowing the system to be controlled very sensitively to qualitative and/or quantitative changes in the condition of the costing present on the windshield.

In carrying out the above object and other objects and features of the present invention, an apparatus and method are provided for controlling a vehicular windshield wiping system including at least one wiper. The apparatus includes a sensor mounted to the windshield for monitoring a portion of the windshield wiped by the wiper during each wipe cycle. The sensor generates a signal, the value of which varies as a coating collects on the monitored portion and the wiper system is activated when the sensor value crosses a switch-on threshold, such that the at least one wiper leaves a resting position and wipes the windshield, passing over the monitored portion of the windshield at least once during each wipe cycle. The apparatus comprises detecting means for determining when the wiper passes over the monitored portion of the windshield for the last time during a first wipe cycle and means for controlling the windshield wiping system based on the sensor value generated after detecting when the wiper passes over the monitored portion of the windshield for the last time during the first wipe cycle.

The advantages accruing to the present invention are numerous. For example, since the apparatus detects the last sweep of the wiper across the monitored portion of the windshield, a new reference value, or switch-on threshold, can be determined after the last wipe based on a maximum sensor signal (associated with an optimally dry windshield). As a result, if the windshield is suddenly coated with a large amount of water, the windshield wiper system can react quickly since the measurement is taken late in the wiping cycle. Furthermore, the present invention takes into account the presence of smears on the windshield when determining the threshold, which allows the wiper system to accurately detect when a coating present on the windshield.

Furthermore, there is no need in its switch arrangement for a separate switch position for the intermittent wiping mode because the device, in the continuous wiping switch position, automatically simultaneously takes over the intermittent wiping mode of the windshield wiping system according to the coating present on the windshield. The switch arrangement therefore only includes the following wiping positions: wiper OFF, automatic with the intermittent wiping and continuous wiping functions in the speed stage I, and continuous wiping in the speed stage II. This substantially reduces the outlay for cable installation.

The above objects and other objects, features, and advantages of the present invention will be readily appreciated from the following detailed description of the best mode for carrying out the invention when taken in connection with the accompanying drawings.

BEST MODE FOR CARRYING OUT THE INVENTION

Figure 1:
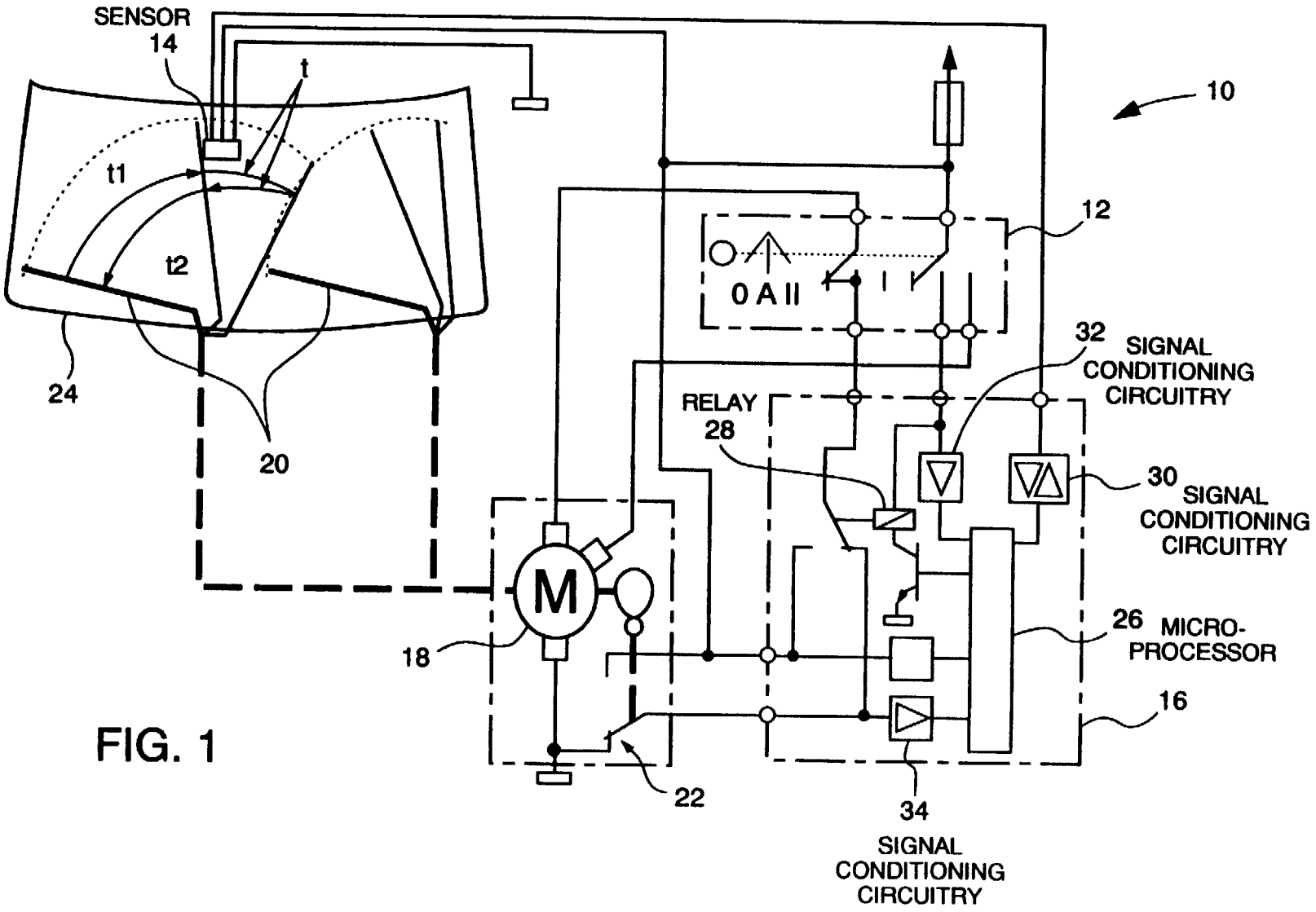
FIG. 1 is a block diagram of the windshield wiping apparatus of the present invention.

Referring now to FIG. 1, there is illustrated an apparatus, shown generally by reference numeral 10, for controlling a windshield wiping system. As shown, the apparatus includes a switch arrangement 12, an optoelectronic sensor 14 mounted to the inside surface of a windshield 24 and a circuit arrangement shown generally by reference numeral 16. The sensor apparatus 14 and the circuit arrangement 16 are activated via the switch arrangement 12. The motor 18 drives the wipers 20 and is activated by the microprocessor 26 via a wiper relay 28 based on signal from the optoelectronic sensor 14 and the switch arrangement 12. Although the wiping system shown includes two wipers, the present invention could also be utilized with a wiper system having more than, or fewer than, two wipers. The optoelectronic sensor includes infrared beam transmitters for emitting beams and infrared beam receivers for receiving the emitted beams, which are modified based on the coating present on the windshield. The optoelectronic sensor 14 generates a signal, the value of which varies based on the presence of a coating, such as liquid, or dirt, on the area of the windshield monitored by the sensor.

With continuing reference to FIG. 1, the sensor signal is provided to a microprocessor 26 which processes the signal and accordingly controls the windshield wiping system. It should be appreciated that although the windshield wiping system is shown to be controlled by a microprocessor, the system could also be controlled by an analog and/or digital switching system, or the like. Communication between the optoelectronic sensor 14 and the microprocessor is facilitated by serial interface/signal processing circuitry shown generally by reference numeral 30. Associated with the motor 18 is a switching contact device 22 for enabling detection of the parked position of the windshield wipers 20 and the activation and deactivation signals of the motor 18 for determining the wiper system operating time. Alternatively, a Hall-effect type device could be utilized, wherein the optoelectronic sensor includes a Hall sensing element and the wiper passing over the sensor includes a magnet. Thus, the wiper is detected as it passes over the sensor. In yet another alternative, the optoelectronic sensor could include a light barrier arrangement, wherein a light beam is emitted by the sensor and interrupted as the wiper passes over the sensor.

The microprocessor 26 provides means for determining the last sweep of the wiper across the monitored portion, based on the operating time of the wiper system, as described in greater detail below. As shown, signals from the switch arrangement 12 and the switch contact device 22 are processed by signal conditioning circuitry shown generally by reference numeral 32 and 34, respectively, prior to being received by the microprocessor.

With continuing reference to FIG. 1, to activate the windshield wiping system the switch arrangement 12 is moved out of an OFF switch position (shown as O) and into an automatic switch position (shown as A). In the automatic switch position A, the intermittent and continuous wiping functions are combined in a speed stage I. The switch arrangement 12 may also be moved into a continuous wiping switch position (shown as II), in which the windshield wiping system is operated in a speed stage II.

Each time the switch arrangement 12 is moved into its automatic switch position A, a wiping cycle t is initiated and an initial reference value is formed based on the sensor signal. If there is a coating (e.g. rain) on the outer surface of the windshield 24 when the automatic switch position A is selected, the wiping system is activated to clean the windshield and one of the windshield wipers 20 passes over the measuring range of the sensor apparatus 14 (i.e. the monitored portion of the windshield) twice during a wiping cycle t. The sensor apparatus is mounted on the inner surface of the windshield 24 such that the windshield wipers 20 do not come into direct contact with the sensor apparatus.

After the start of a wiping cycle t, the portion of the windshield monitored by the sensor apparatus 14 is swept over once during the upward stroke and for a second time during the return stroke of the windshield wipers 20 and is therefore cleaned twice. If the circuit arrangement 16 detects a further coating that strongly impairs visibility (e.g. heavy rain) on the monitored portion of the windshield 24 based on the signals from the sensor apparatus 14 after the second sweep during a wiping cycle t, a new wiping cycle t is immediately started after the windshield wipers 20 have reached the parked position (at the end of wiping cycle t).

Figures 2, 3:
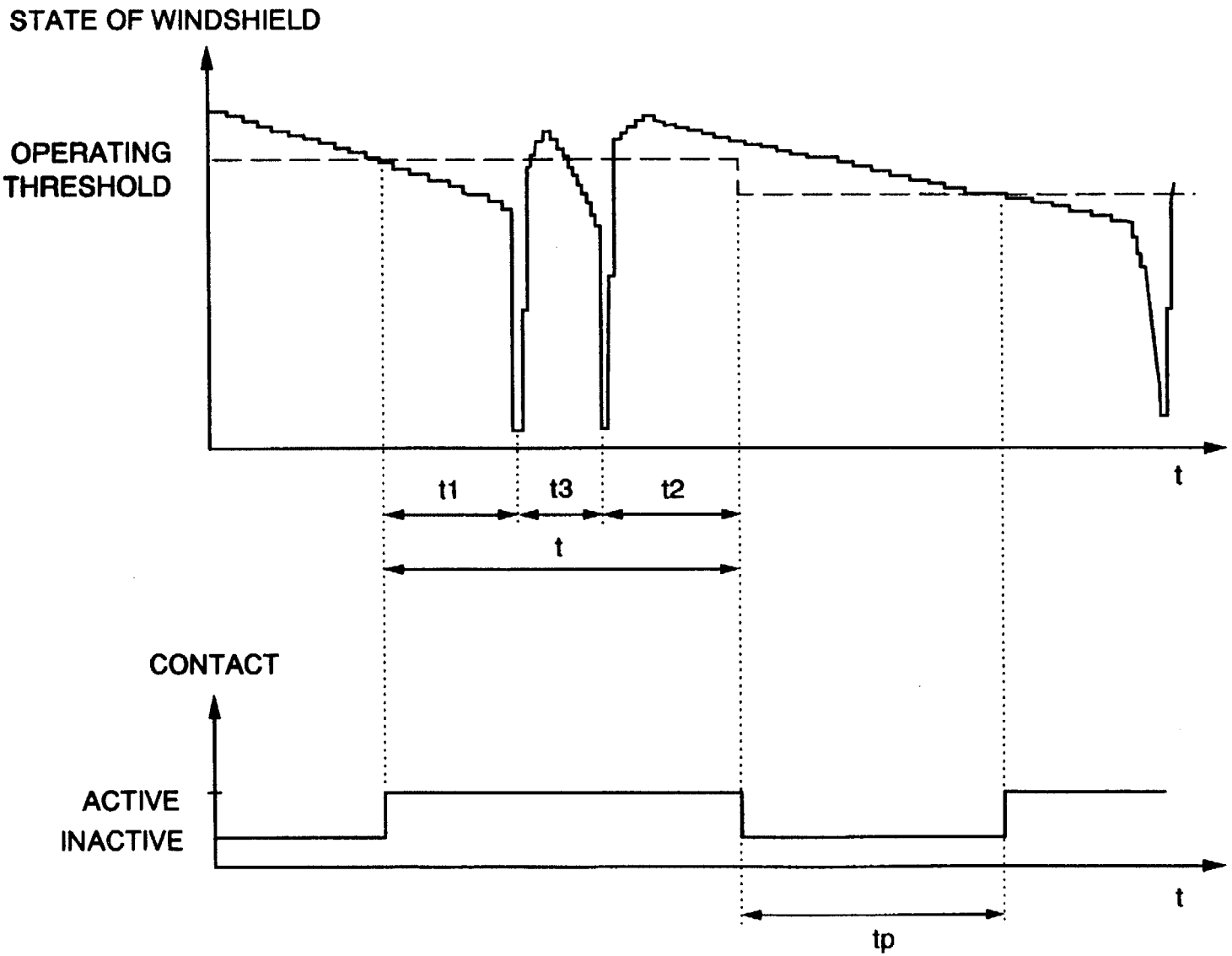
FIG. 2 is a graphical representation of a signal characteristic generated by the apparatus with regard to a coating.
FIG. 3 is a graphical representation of an electrical trace for a switching contact device for use with the present invention, illustrating active/inactive periods in conjunction with FIG. 2.

However, if the circuit arrangement 16 detects a further coating that only slightly impairs visibility (e.g. light rain) on the windshield 24 after the second sweep during a wiping cycle t, after the windshield wipers 20 have reached the parked position, the wipers are held by the switching contact device 22 in the parked position for a specific length of time (e.g. time delay tp shown in FIG. 3).

Preferably, the length of the time delay tp is re-determined after each wiping cycle in dependence upon the coating (e.g. rain intensity) newly forming on the windshield 24. To allow for control of the motor 18 to be effected, the signals of the sensor 14 generated due to the coating (e.g. rain) present on the windshield 24 are supplied to the circuit arrangement 16. Qualitative and/or quantitative changes in the condition of the coating produce a variation in the signals, and the resulting signals are processed by the microprocessor 26 and converted into control signals which then control operation of the motor 18. To keep the spatial requirement and the cabling outlay to a minimum, the sensor 14 and the circuit arrangement 16 with their essential elements are preferably housed in a common housing. To allow the wiping cycle frequency to be adjusted particularly sensitively to qualitative and/or quantitative changes in the condition of the coating (e.g. rain) present on the windshield 24, a precise definition of the instant and duration of evaluation of the coating by the circuit arrangement 16 is required.

Referring now to FIG. 2, there is illustrated a graphical representation of a representative signal characteristic generated by the apparatus 10 with regard to a coating. As shown, it is possible from the sensor signal characteristic to recognize when the windshield wipers 20 have swept over the monitored portion of the windshield (i.e. the measuring range of the sensor apparatus 14). This may be recognized from the representative characteristic of the signals both for the first and for the second sweep of the windshield wipers 20 during a wiping cycle t.

With continuing reference to FIG. 2, to obtain evaluation conditions which are reproducible as accurately as possible, it is therefore preferable, for evaluation of the coating present on the windshield 24, to use only those signals supplied by the optoelectronic sensor 14 to the circuit arrangement 16 for influencing the motor 18 produced by the optoelectronic sensor 14 from the moment shortly after the last sweep across the monitored portion up to initiation of a new wiping cycle t. Most preferably, a new wiping cycle t is initiated if the signal of the optoelectronic sensor 14 drops below a specific switch-on, or operating, threshold. Areas of uncertainty may however arise if, as a result of the occurrence of specific qualitative and/or quantitative states of the coating (e.g. rain) on the windshield 24, signal characteristics are produced which are very similar to the representative characteristic of the signals for the sweep process of the windshield wipers 20, such that some misoperation cannot be entirely excluded. For inspecting specific qualitative and/or quantitative states of the coating (e.g. rain) on the windshield 24, it is therefore particularly advantageous if in addition, prior to the wiping of the monitored portion of the windshield, the circuit arrangement 16 knows in advance the time range of the wiping process.

For detecting the time range of the last sweep in relation to a wiping cycle t, the microprocessor 26 provides a means for determining the last sweep of the windshield wiper across the monitored portion of the windshield, based on the wipe cycle operating time. The microprocessor is informed by the contact device 22 when the windshield wipers 20 have left their parked position (start signal), whereupon a wiping cycle t is initiated, and when the windshield wipers 20 are back in their parked position (end signal), whereupon said wiping cycle t is complete. The total active time of the switching contact device 22 therefore corresponds to the total operating time of the windshield wipers 20 during a wiping cycle t.

As best shown in FIG. 2, to allow the circuit arrangement 16 precisely to predetermine the last sweep process in relation to a wiping cycle t, the wiping cycle t is separated into individual operating times t1 and t2. The operating time t1 corresponds to the period of time from the start signal (upward stroke of the windshield wipers 20) of a wiping cycle t up to attainment of the measuring range of the sensor apparatus 14 (just before the start of sweeping of the monitored portion) and the operating time t2 corresponds to the period of time from completion of the second sweep process (a second sweep over the monitored portion has just been completed) up to the end signal of the wiping cycle t (the windshield wipers 20 are back in their parked position). The two operating times t1 and t2 are, apart from insignificantly small differences in their value, virtually identical.

As described above, to determine the two operating times t1 and t2, the total active time of the switching contact device 22 is acquired. The total active time of the switching contact device 22 is acted upon by a factor X specific to the windshield wiping system, thereby producing the time values for the operating times t1 and t2. Using the time values, the circuit arrangement 16 is able to calculate and predetermine the instant of the second sweep process. Preferably, the duration of the complete previous wipe cycle is multiplied by the factor X to obtain an estimated point in time when the second sweep of the wiper across the monitored portion will occur. For example, the second sweep may be expected at a time when the wipe cycle is 70% complete. This point in time is then expanded to a time window having a duration, for example, of about 40 mS to about 60 mS, during which the last wiper crossing is expected (i.e. during which a sharp rise in the sensor signal is expected). The microprocessor then analyzes the sensor signal during this time window for such a sharp rise, thereby detecting the second sweep. Once the second sweep is identified, the microprocessor then performs a number of functions, such as determining a new reference value, or initiating a rain pattern recognition procedure.

In the preferred embodiment, the factor X is, for example, dependent upon the position of the optoelectronic sensor 14 on the windshield 24 and upon other conditions specific to windshield wiping systems. It is important for the factor X to be standardized to the total operating time of a wiping cycle t of the windshield wiping system so as to be independent of, for example, power supply voltage fluctuations, aging effects on the wipers, temperature changes etc. The microprocessor effects automatic adaptation of the factor X throughout the life of the windshield wiping system. Automatic adaptation is effected when the microprocessor regularly detects a sweep process which no longer falls within the predetermined time range.

With continuing reference to FIG. 2, there is illustrated a representative signal characteristic produced by the sensor apparatus 14 with regard to a coating present on the windshield 24. Time is plotted on the X-axis of the graph and the state of the windshield 24 is plotted on the Y-axis. If the state of the windshield 24 changes, e.g. as a result of rain, so too does the signal value produced by the sensor 14 when the switch arrangement 12 is in its automatic switch position A. After a specific period of time, the signal value of the sensor apparatus 14 drops below the switch-on, or operating, threshold. A wiping cycle t is therefore automatically triggered.

The signal value then, for example, continues to drop fairly continuously because of rain up to the instant when the windshield wiper 20 has reached the monitored portion of the windshield for the fast time. The length of time which has elapsed until then corresponds to the operating time t1, as shown in FIG. 2. The signal value of the sensor apparatus 14 then drops sharply because the windshield wipers 20 are sweeping over the monitored portion for the first time and pushing some of the coating, e.g. rain, in front of it. The monitored portion is clean after the first sweep, with the result that the signal value of the sensor apparatus 14 then rises sharply again. The coating, e.g. rain, then continuously builds up again, with the result that the signal value continuously drops once more until the windshield wipers 20 have reached the monitored portion of the windshield for the second time. The signal value of the sensor 14 then drops steeply once more because the windshield wiper is sweeping over the monitored portion for the second time and is again pushing some of the newly formed coating, e.g. rain, in front of it. The monitored portion is once more clean after the second sweep, with the result that the signal value again rises steeply. The length of time taken by the wipers 20 to move directly after the second sweep back into the parked position corresponds to the operating time t2.

As FIGS. 2 and 3 particularly reveal, the active time of the switching contact device 22 starts with the initiation of a wiping cycle t. The already defined operating times t1 and t2 are just as much part of the active time of the switching contact device 22 as the operating time range t3 lying between said two operating times t1 and t2. The operating times t1 and t2 as well as the operating time range t3 therefore constitute the total active time of the switching contact device 22 in relation to a wiping cycle t. As best shown in FIG. 3, a wiping cycle t is possibly followed by a time delay tp. During each wiping cycle t, the operating time t2 is utilized by the circuit arrangement 16 to redefine the switch-on threshold in dependence upon the acquired reference value. Additionally, the operating time t2 and possibly the time delay tp are utilized by the circuit arrangement 16 to decide when a new wiping cycle is to be triggered. The maximum signal value of the sensor 14, which sets in shortly after the second sweep process within the operating time t2, is read into the circuit arrangement 16 as a new reference value for the next wiping cycle t. In dependence upon the new reference value, the switch-on threshold used as a start value for the following wiping cycle t is automatically defined, the order of magnitude of the new threshold being about 95% of the new reference value.

If, upon the windshield wipers 20 reaching their parked position, the signal value of the sensor 14 again drops below the switch-on threshold as a result of a newly forming coating, e.g. rain, a new wiping cycle t is initiated by the circuit arrangement 16. However, if, upon the windshield wipers 20 reaching their parked position, the signal value of the sensor apparatus 14 does not drop below the switch-on threshold, a time delay tp follows the operating time t2. The time delay tp arises in dependence upon the period of time which elapses before there is a drop below the threshold produced as a result of the newly forming coating, e.g. rain.

If, during the period of time fixed as a maximum for the time delay (e.g. one minute), there is insufficient formation of a coating, e.g. as a result of rain, so that the signal value of the optoelectronic sensor 14 does not drop below the switch-on threshold, a new wiping cycle t is in any case triggered. The purpose of triggering a new wiping cycle t is, on the one hand, to allow the formation of a new initial reference value and, on the other hand, to indicate to the vehicle operator that the switch arrangement 12 is in its automatic switch position A. The vehicle operator may choose, in such a situation, to move the switch arrangement 12 into its OFF switch position to avoid unnecessary wiping cycles.

It is understood, of course, that while the form of the invention hereto shown and described constitutes the preferred embodiment of the invention, it is not intended to illustrate all possible forms thereof. It will also be understood that the words used are words of description rather than limitation, and that various changes may be made without departing from the spirit and scope of the invention.

What is claimed is:

1. An apparatus for controlling a vehicular windshield wiping system including a motor and at least one windshield wiper, the apparatus including a sensor mounted to the windshield for monitoring a portion of the windshield wiped by the wiper during each wipe cycle, the sensor generating a signal having a value which varies as a coating collects on the monitored portion, the wiping system being activated when the sensor value crosses a switch-on threshold such that the at least one wiper leaves a resting position and wipes the windshield, passing over the monitored portion of the windshield at least once during each wipe cycle, the apparatus further comprising:

detecting means for determining when the at least one wiper passes over the monitored portion of the windshield for the last time during a first wipe cycle; and means for controlling the windshield wiping system based on the sensor value generated only after determining when the wiper passes over the monitored portion of the windshield for the last time during the first wipe cycle.

2. The apparatus of claim 1 further comprising means for modifying the switch-on threshold based on the signal value generated only after the wiper passes over the monitored portion of the windshield for the last time during the first wipe cycle.

3. The apparatus of claim 2 wherein the detecting means includes a Hall-effect switch arrangement associated with the sensor and the at least one windshield wiper.

4. The apparatus of claim 2 wherein the detecting means includes a light barrier arrangement wherein the at least one windshield wiper interrupts a beam of light emitted by the sensor.

5. An apparatus for controlling a vehicular windshield wiping system including a motor and at least one windshield wiper, the apparatus including a sensor mounted to the windshield for monitoring a portion of the windshield wiped by the wiper during each wipe cycle, the sensor generating a signal having a value which varies as a coating collects on the monitored portion, the wiping system being activated when the sensor value crosses a switch-on threshold such that the at least one wiper leaves a resting position and wipes the windshield, passing over the monitored portion of the windshield at least once during each wipe cycle, the apparatus further comprising:

detecting means for determining when the at least one wiper passes over the monitored portion of the windshield for the last time during a first wipe cycle;

switch contact means for detecting a resting position of the wiper and generating a resting position signal, and wherein the means for detecting includes means for determining the operating time of the first wipe cycle based on the resting position signal; and means for controlling the windshield wiping system based on the sensor value generated after determining when the wiper passes over the monitored portion of the windshield for the last time during the first wipe cycle.

6. The apparatus of claim 5 further comprising compensating means for compensating the operating time of the first wipe cycle by a factor based on operational parameters so as to identify a particular point in time during the first wipe cycle when the wiper is expected to pass over the monitored portion of the windshield for the last time.

7. The apparatus of claim 6 wherein operating time is compensated in real-time.

8. The apparatus of claim 6 wherein the compensating means includes means for defining a time window around the particular point in time, the detecting means determining when the wiper passes over the monitored portion of the windshield for the last time during the first wipe cycle based on the sensor signal during the time window.

9. The apparatus of claim 8 wherein the time window is about 40 milliseconds to about 60 milliseconds long.

10. The apparatus of claim 5 wherein the detecting means includes means for determining the length of time between the wiper passing over the monitored portion of the windshield for the last time during the first wipe cycle and the wiper returning to the resting position at the end of the first wipe cycle.

11. An apparatus for controlling a vehicular windshield wiping system including a motor and at least one windshield wiper, the apparatus including a sensor mounted to the windshield for monitoring a portion of the windshield wiped by the wiper during each wipe cycle, the sensor generating a signal having a value which vanes as a coating collects on the monitored portion, the wiping system being activated when the sensor value crosses a switch-on threshold such that the at least one wiper leaves a resting position and wipes the windshield, passing over the monitored portion of the windshield at least once during each wipe cycle, the apparatus further comprising:

detecting means for determining when the at least one wiper passes over the monitored portion of the windshield for the last time during a first wipe cycle;

time delay means for delaying initiation of an additional wipe cycle after the one wiper passes over the monitored portion of the windshield for the last time during the first wipe cycle; and means for controlling the windshield wiping system based on the sensor value generated after determining when the wiper passes over the monitored portion of the windshield for the last time during the first wipe cycle.

12. An apparatus for controlling a vehicular windshield wiping system including a motor and at least one windshield wiper, the apparatus including a sensor mounted to the windshield for monitoring a portion of the windshield wiped by the wiper during each wipe cycle, the sensor generating a signal having a value which varies as a coating collects on the monitored portion, the wiping system being activated when the sensor value crosses a switch-on threshold such that the at least one wiper leaves a resting position and wipes the windshield, passing over the monitored portion of the windshield at least once during each wipe cycle, the apparatus further comprising:

detecting means for determining when the at least one wiper passes over the monitored portion of the windshield for the last time during a first wipe cycle;

an activation switch for activating the wiping system and triggering an initial wiping cycle, and means for determining an initial threshold value after the at least one windshield wiper passes over the monitored portion for the last time during the initial wiping cycle; and means for controlling the windshield wiping system based on the sensor value generated after determining when the wiper passes over the monitored portion of the windshield for the last time during the first wipe cycle.

13. The apparatus of claim 12 further comprising means for initiating at least one wiping cycle when the activation switch is activated and after a predetermined period of time has elapsed, so as to obtain a new switch-on threshold and to inform a vehicle operator that the activation switch is activated.

14. A method for controlling a vehicular windshield wiping system including a motor and at least one windshield wiper, the method comprising the steps of: monitoring a portion of the windshield wiped by the wiper during a wipe cycle;

generating a signal having a value which varies as a coating collects on the monitored portion of the windshield;

activating the motor when the signal value crosses a switch-on threshold, such that the wiper leaves a resting position and wipes the windshield, passing over the monitored red portion of the windshield at least once during the wipe cycle;

determining when the wiper passes over the monitored portion of the windshield for the last time during the wipe cycle; and controlling the windshield wiping system based on the signal value generated only alter determining when the wiper passes over the monitored portion of the windshield for the last time during the wipe cycle.

15. The method of claim 14 further comprising the step of modifying the switch-on threshold based on the signal value generated only after the wiper passes over the monitored portion of the windshield for the last time during the first wipe cycle.

16. A method for controlling a vehicular windshield wiping system including a motor and at least one windshield wiper, the method comprising: monitoring a portion of the windshield wiped by the wiper during a wipe cycle;

generating a signal having a value which varies as a coating collects on the monitored portion of the windshield;

activating the motor when the signal value crosses a switch-on threshold, such that the wiper leaves a resting position and wipes the windshield, passing over the monitored portion of the windshield at least once during the wipe cycle;

determining when the wiper passes over the monitored portion of the windshield for the last time during the wipe cycle;

modifying the switch-on threshold based on the signal value generated after the wiper passes over the monitored portion of the windshield for the last time during the first wipe cycle;

detecting the resting position of the wiper;

generating a resting position signal;

determining the operating time of the first wipe cycle based on the resting position signal; and controlling the windshield wiping system based on the signal value generated after determining when the wiper passes over the monitored portion of the windshield for the last time during the wipe cycle.

* * * * *